United States Patent [19]
Gasparini et al.

[11] Patent Number: 5,729,068
[45] Date of Patent: Mar. 17, 1998

[54] ELECTRIC MACHINE WITH DEFORMABLE INSULATION ON SOLDERING LUGS

[75] Inventors: Rico Gasparini, Rieden; Kurt Herzog, Oberengstringen; Roland Schuler, Wettingen, all of Switzerland

[73] Assignee: Asea Brown Boveri AG, Baden, Switzerland

[21] Appl. No.: 550,235

[22] Filed: Oct. 30, 1995

[30] Foreign Application Priority Data

Nov. 17, 1994 [DE] Germany ............... 44 40 950.8

[51] Int. Cl.⁶ ............... H02K 1/00; H02K 3/00
[52] U.S. Cl. ............... 310/179; 310/250; 310/260; 310/213; 310/214; 310/270; 29/596
[58] Field of Search ............... 310/179, 250, 310/260, 213, 214; 29/596

[56] References Cited

U.S. PATENT DOCUMENTS

| | | | |
|---|---|---|---|
| 3,679,925 | 7/1972 | Fort | 310/196 |
| 3,891,880 | 6/1975 | Britsch | 310/196 |
| 4,200,818 | 4/1980 | Ruffing et al. | 310/214 |
| 4,318,020 | 3/1982 | Meyer | 310/215 |
| 4,345,175 | 8/1982 | Jones | 310/45 |
| 4,347,454 | 8/1982 | Gellert et al. | 310/193 |
| 4,385,252 | 5/1983 | Butman, Jr. et al. | 310/214 |
| 4,403,163 | 9/1983 | Armerding et al. | 310/213 |
| 4,484,024 | 11/1984 | Bentley, Jr. | |
| 5,030,870 | 7/1991 | Wichmann | 310/215 |
| 5,099,159 | 3/1992 | Liptak et al. | 310/45 |
| 5,214,839 | 6/1993 | Rieber et al. | 29/596 |
| 5,300,844 | 4/1994 | Schuler | 310/215 |
| 5,319,269 | 6/1994 | Bryant | 310/43 |
| 5,319,276 | 6/1994 | Schuler | 310/196 |
| 5,574,325 | 11/1996 | Von Musil et al. | 310/215 |

FOREIGN PATENT DOCUMENTS

4237079 A1  5/1994  Germany.

OTHER PUBLICATIONS

Sequenz, H.; Herstellung der Wicklungen elektrischer Maschinen, Springer–Verlag, Wien, New York, 1973, pp. 153, 154 and 162.

Meyer, Karl–Heinz; Warmeschrumpfende Garnituren fur Niederspannungskabel; Elektro–Aneziger, 1968, Nr. 22, pp. 19–20.

JP 61–173651 (A); Patents Abstracts of Japan, E–466, Dec. 23, 1986, vol. 10, No. 384.

*Primary Examiner*—Clayton E. LaBalle
*Assistant Examiner*—Elvin G. Enad
*Attorney, Agent, or Firm*—Oblon, Spivak, McClelland, Maier & Neustadt, P.C.

[57] ABSTRACT

An electric machine having a stator winding which is impregnated by total immersion. The bar ends of the stator winding have soldering lugs which are insulated from one another and with respect to grounded housing parts. In order to simplify the assembly of the soldering lug insulation and at the same time to improve heat transfer, the soldering lugs are surrounded on all sides by a deformable insulating material with is pervious to impregnating resin. The insulating material is fixed by means of a shrinkable fabric which is likewise pervious to the impregnating resin. The insulation and shrinkable fabric are impregnated and cured at the same time as the winding insulation.

5 Claims, 2 Drawing Sheets

ELECTRIC MACHINE WITH DEFORMABLE INSULATION ON SOLDERING LUGS

BACKGROUND OF THE INVENTION

1. Field of the Invention

The invention relates to an electric machine having a stator winding whose bar ends have soldering lugs in the winding overhang which are insulated from one another and with respect to grounded housing parts.

Soldering lug insulation of this type is described and illustrated, for example, in the book SEQUENZ "Herstellung der Wicklungen elektrischer Maschinen" [Production of the windings of electric machines] Springer-Verlag Vienna, New York, 1973, page 162, FIG. 100b.

2. Discussion of Background

The bar ends (soldering lugs) of the stator winding of electric machines are normally insulated by means of a cap of insulating material, which is pushed over the soldering lug. This cap has to be matched as precisely as possible to the geometry of the soldering lug. Due to the way in which the soldering lugs are produced, they are not all individually the same.

In the case of stator windings of large machines, these caps are filled, for example foam-filled or potted, with a curing plastic. In the case of stator windings which make use of the technique of impregnation by total immersion (cf. loc. cit. page 153, 154), this filling takes place before or after the impregnation by total immersion. The method is always time-consuming, because for this purpose the entire stator winding has to be brought into the correct position in each case. Moreover, relatively poor heat transfers ensue from the locally produced, thick layers of filling compound having a low thermal conductivity.

SUMMARY OF THE INVENTION

Accordingly, one object of the invention is to provide novel soldering lug insulation which is economical to produce, requires virtually no effort for matching and has a good thermal conductivity.

This object is achieved according to the invention by the fact that the soldering lug is surrounded on all sides by a deformable insulating material which is pervious to the impregnating resin and is held by means of a shrinkable fabric which is likewise pervious to the impregnating resin.

The insulating material preferably comprises matts, nonwovens, fabrics having a high thermal conductivity, for example ceramic, glass. The shrinkable fabric is preferably a glass/polyester mixed fabric.

The advantage of the invention is particularly evident in the fact that the deformable insulating material matches the shape of the soldering lug very well and is pressed onto the soldering lug well by the shrinkable fabric as early as during the predrying process, which precedes the process of impregnation by total immersion, or during curing of the impregnated winding. The shrinkable fabric also permits shrinkage even during application, for example by means of a hot air blower. During the subsequent impregnation by total immersion, a sufficient quantity of impregnating resin can nevertheless penetrate the two layers as far as the soldering lug and thus reliably secure the "cap" to the soldering lug.

The thermal conductivity is distinctly higher than in the case of conventional solutions using a "stiff" insulating cap and filling compound. The soldering lug insulation is simple and economical to produce. It can be used for a wide variety of lug shapes, because it is quasi self-matching. The outlay on tools is minimal, since the fixing is done by the shrinking fabric.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
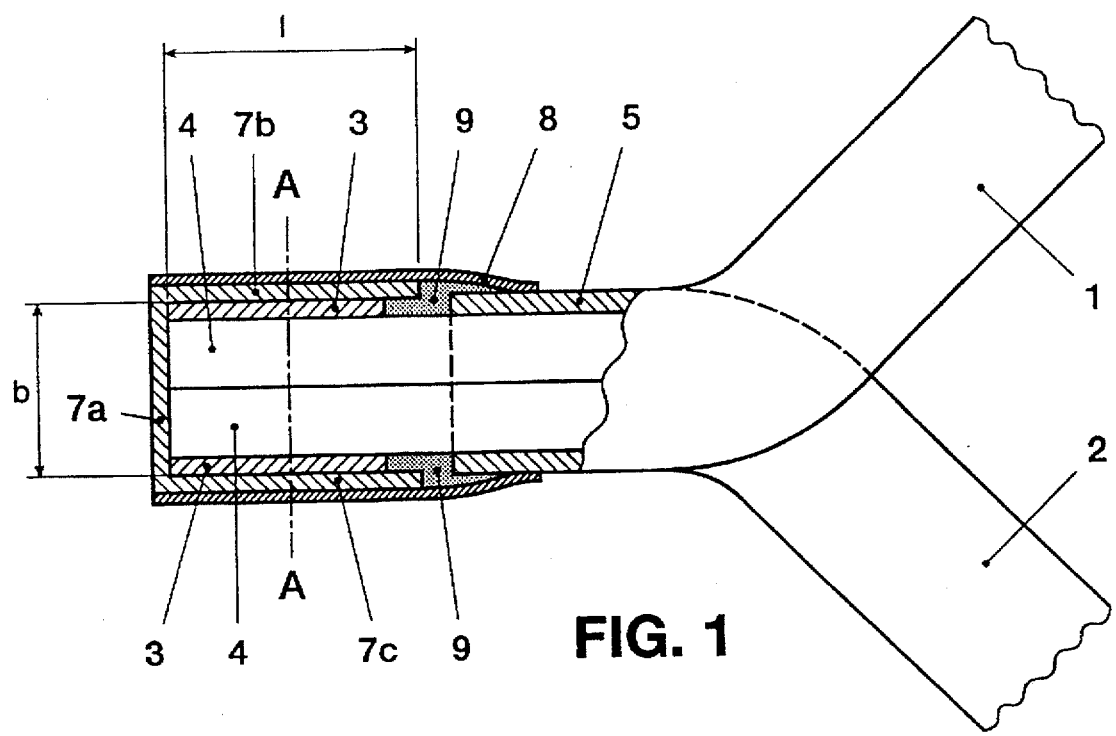
FIG. 1 shows a longitudinal section through the bar end, provided with a soldering lug, of a stator winding of an electric machine.
Figure 2:
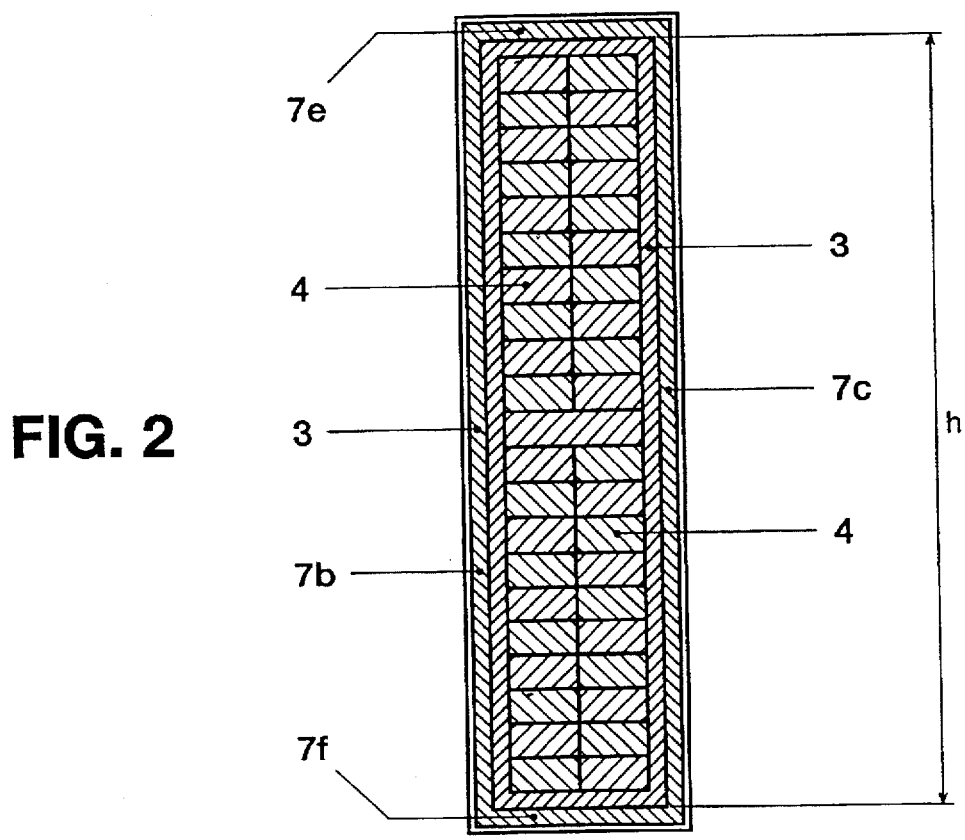
FIG. 2 shows a cross section through the bar end according to FIG. 1, along the line AA thereof.

Referring now to the drawings, wherein like reference numerals designate identical or corresponding parts throughout the several views, in FIG. 1 two stator winding bars 1, 2, which emerge from different slots of a stator laminated body (not illustrated) of an electric machine, are electrically and mechanically connected to one another by means of a soldering lug 3. As FIG. 2 shows, the bars 1, 2 comprise a multiplicity of mutually insulated conductor elements 4, which are surrounded by bar insulation 5. The latter terminates shortly before the soldering lug 3 (FIG. 1).

The soldering lug 3 is made of a copper alloy and, in the case of the example, has the form of a rectangular tube element. It is pushed onto both bare bar ends, which are separated by means of a filling element 6 made of copper, and is joined to said ends by soft or silver soldering in a known manner.

Figure 3:
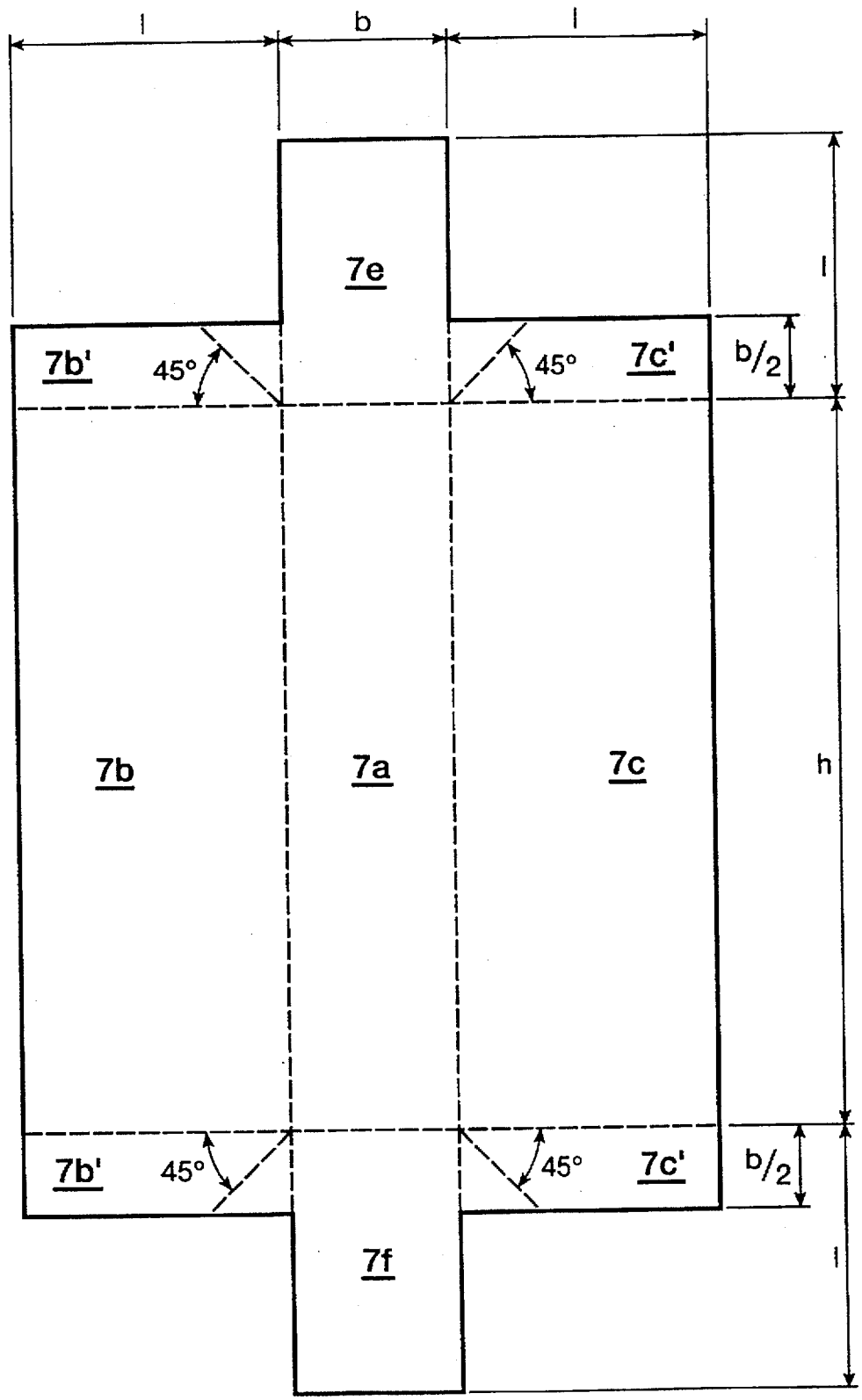
FIG. 3 shows a plan view of a matt of insulating material in the unfolded state.

Wrapped around the soldering lug is a nonwoven 7 made of thermally readily conductive insulating material, which is pervious to the impregnating resin, and having the form illustrated in FIG. 3. Suitable for this purpose are, for example, nonwovens or matts made of ceramic or glass fibers. It includes an end part 7a, having a length h=radial height of the soldering lug 3 and having a width b=width of the soldering lug 3 in the circumferential direction, two broad side parts 7b, 7c, having a width l=length of the soldering lug in the axial direction and having a length h+b, as well as two narrow side parts 7e, 7f having the width b and the length l–b/2. The fold lines are illustrated by dashed lines in FIG. 3. In the assembled state, this structure has approximately the shape of a cap, which surrounds the soldering lug 3 on all sides, the parts 7b' and 7c' coming to bear on the narrow sides of the soldering lug, while the center part of 7b and 7c covers the broad sides of the soldering lug 3. A uniform thickness of application is achieved, preferably without any overlaps on the broad sides of the soldering lug 3, as a result of this severing and suitable position of the folds—in FIG. 3 the dimensions and fold lines are drawn to scale with regard to FIGS. 1 and 2. At the same time it is also possible to avoid insulation joints at voltage-critical points (for example edges).

This cap is surrounded by a piece of shrinking fabric 8, for example a mixed fabric with warp threads made of shrinkable polyester and weft threads made of glass. The shrinking fabric 8 reaches right up to the end part 7a at the free end of the soldering lug and extends inward until it is over the bar insulation 5. This shrinking fabric part can be formed, for example, by repeatedly wrapping fabric in the form of a strip around the nonwoven 7, or it comprises a hose section made of shrinking fabric. In both cases, the shrinkable threads should extend in the circumferential direction. In this case, the shrinkage in the circumferential direction is intended to be in the range from 5 to 20%, that is to say in the range of conventional shrinking strips.

Mixed fabrics of this type comprise, for example, warp threads made of prestretched polyester and weft threads made of glass. If such a fabric is heated, the warp threads become shorter, while the weft threads essentially retain their length. This causes a shortening in the longitudinal direction of the strip. The invention utilizes this property.

After the incorporation of the bars and fitting of the soldering lugs 3, the insulation (nonwoven 7) is fitted to the individual soldering lugs. As a result of the shrinkage of the shrinking fabric 8, for example with the aid of a hot air blower, the nonwoven 7 nestles closely against the soldering lug 3 under the influence of the shrinking force of the shrinking fabric 8. During the subsequent process of impregnation by total immersion, when the entire stator body together with the stator winding is inundated with impregnating resin, the impregnating resin penetrates the bar insulation and the soldering lug insulation (layers 7 and 8), in the process fills all the voids in the fabric, nonwoven or matt and between the latter and the soldering lug, and also penetrates the remaining void 9 (FIG. 1) between the bar insulation 5 and the soldering lug 3 and nonwoven 7. The final shrinkage, fixing and curing of the insulation then take place during the concluding curing process.

Obviously, numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. An electric machine having a stator winding which may be impregnated by total immersion, said stator winding have bar ends with soldering lugs in a winding overhang which are insulated from one another, wherein the soldering lugs are surrounded on all sides by a deformable insulating material which is pervious to impregnating resin, the deformable insulating material being fitted to the lugs by shrinking of a shrinkable fabric before being impregnated, the shrinkable fabric also being pervious to impregnating resin.

2. The electric machine as claimed in claim 1, wherein the insulating material is a nonwoven, a matt or a fabric which is wrapped around the soldering lugs preferably without any overlap on broad sides of said lugs.

3. The electric machine as claimed in claim 2, wherein the insulating material is one based on ceramic or glass fiber.

4. The electric machine as claimed in claim 1, wherein the shrinkable fabric is a mixed fabric made of shrinkable threads, preferably polyester, and non-shrinkable threads, preferably glass or ceramic, the shrinkable threads extending in the circumferential direction around the soldering lug.

5. The electric machine as claimed in claim 4, wherein the shrinkage is between 5 and 20%.

* * * * *